G. P. TATUM.
BOLT HOLDING MACHINE.
APPLICATION FILED OCT. 9, 1912.
1,051,173.
Patented Jan. 21, 1913.
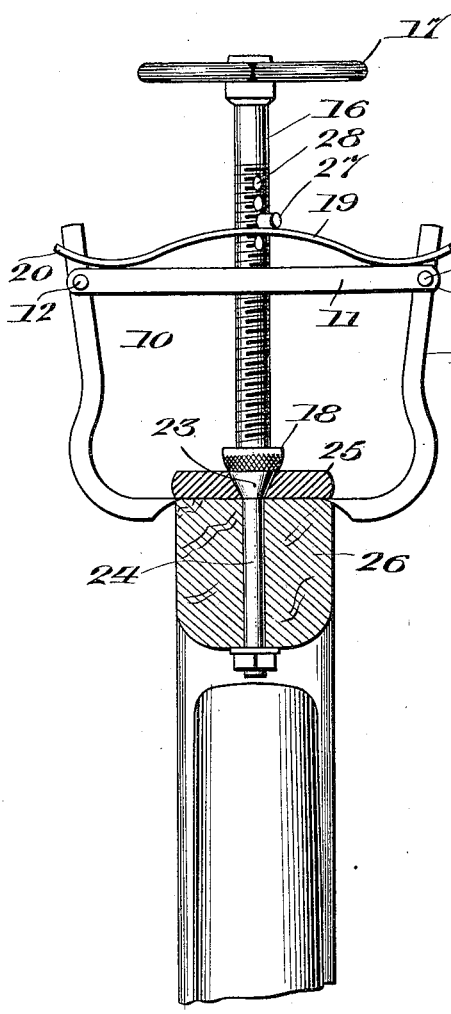
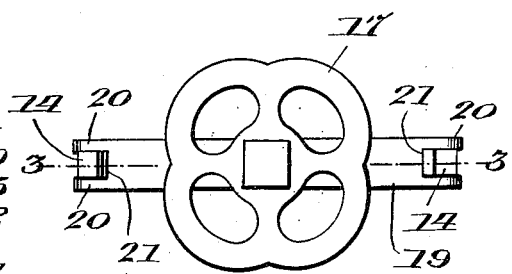
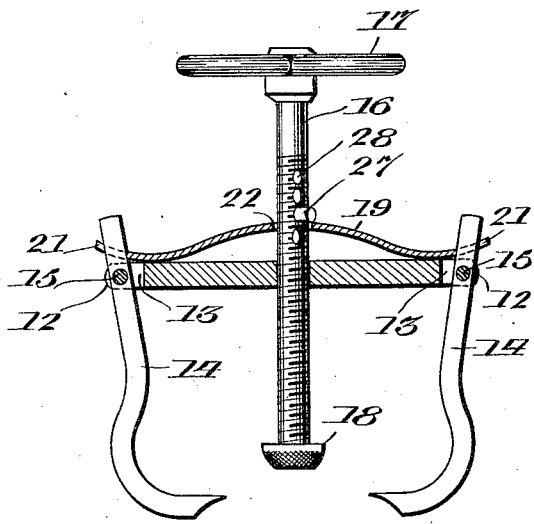
Witnesses
Inventor
George P. Tatum
By Victor J. Evans
Attorney

UNITED STATES PATENT OFFICE.

GEORGE P. TATUM, OF COALING, ALABAMA.

BOLT-HOLDING MACHINE.

1,051,173.  Specification of Letters Patent.  Patented Jan. 21, 1913.

Application filed October 9, 1912. Serial No. 724,860.

*To all whom it may concern:*

Be it known that I, GEORGE P. TATUM, a citizen of the United States, residing at Coaling, in the county of Tuscaloosa and State of Alabama, have invented new and useful Improvements in Bolt-Holding Machines, of which the following is a specification.

An object of the invention is to provide a machine for securing bolts in rigid position in order to facilitate the screwing of nuts thereon.

The invention is particularly adaptable for use in securing the tires on vehicle wheels and in which it is desired to secure the bolt rigidly and prevent any turning of the bolt so that the nut can be readily screwed on to the bolt.

In the further disclosure of the invention reference is to be had to the accompanying drawings, constituting a part of this specification, in which similar characters of reference denote corresponding parts in all the views, and in which:

Figure 1 is a side elevation of the device, showing the same in applied position to secure a bolt rigidly on a vehicle tire, the rim and tire being shown in section; Fig. 2 is a plan view; and Fig. 3 is a vertical sectional view taken on the line 3—3 in Fig. 2.

Referring more particularly to the views, I employ a frame 10 consisting of a horizontally arranged bar 11 provided at the ends thereof with ears 12 forming recesses 13. Mounted to swing on the bar 11 and lying in the recesses 13 are gripping members 14, suitable pins 15 being passed through the ears 12 and upper ends of the gripping members 14 to swingingly support the gripping members on the ends of the bar, the upper ends of the gripping members being adapted to extend upwardly beyond the upper face of the bar, as shown. A screw 16 has threaded connection with the bar 11 and is arranged in a plane perpendicular to the plane of the bar, the said screw being provided with a suitable handle 17 and a head 18. A flat spring 19 is supported on the bar 11 and terminates in ears 20 forming recesses 21 in the spring and in which the upper ends of the gripping members 14 repose, as shown, the screw 16 being loosely passed through an opening 22 in the flat spring 19.

In the use of the device as shown in Fig. 1, rotation is imparted to the handle 17, thus moving the screw 16 downwardly until the screw almost engages a head 23 of a bolt 24 passing through the tire 25 and rim 26 having the tire 25 thereon. A key 27 is now passed through one of a series of openings 28 in the screw 16 and when further rotation is imparted to the screw 16 by operating the handle 17, the key 27 bearing down on the medial portion of the spring 19, will cause the ends of the spring to move outwardly, thus bearing against the upper ends of the gripping members 14 and moving the lower ends of the gripping members into gripping engagement with the rim 26 and tire 25, as shown, it being thus seen that when the gripping members grip the tire 25 and rim 26, as mentioned, the head 18 of the screw 16 will engage the bolt 24, thus securing the same rigidly relatively to the tire 25 and rim 26 so that the usual nut can be screwed upon the protruding threaded end of the bolt.

Having thus described my invention, I claim:

1. In a device of the class described, the combination with a frame, of gripping members mounted to swing thereon, a flat spring supported on the frame and having the ends thereof loosely engaging the gripping members, a screw having threaded connection with the frame and passing loosely through an opening in the spring, a head on the said screw, and a key for removable insertion in openings in the said screw and adapted to engage the said spring when the said screw is screwed downwardly on the said frame.

2. In a device of the class described, the combination with a frame, of ears formed with the said frame, gripping members mounted to swing on the said ears and having portions thereof extending upwardly beyond the frame, a spring supported on the frame and engaging the upwardly extending portions of the said gripping members, a screw having threaded connection with the said frame and having an end thereof adapted for engagement with a bolt, and a key for removable connection with the said screw and adapted to engage the said spring and actuate the same when the said screw is screwed downwardly upon the said frame.

In testimony whereof I affix my signature in presence of two witnesses.

GEORGE P. TATUM.

Witnesses:
 THOS. H. FOSTER,
 CLAUDE C. JONES.

Copies of this patent may be obtained for five cents each, by addressing the "Commissioner of Patents, Washington, D. C."